United States Patent [19]

Yamamoto et al.

[11] Patent Number: 4,893,134

[45] Date of Patent: Jan. 9, 1990

[54] THERMAL TRANSFER RECORDING APPARATUS

[75] Inventors: Junichi Yamamoto; Akihiko Onuma; Kouji Shibuya; Yasukuni Omata, all of Osaka, Japan

[73] Assignee: Minolta Camera Kabushiki Kaisha, Osaka, Japan

[21] Appl. No.: 239,760

[22] Filed: Sep. 2, 1988

[30] Foreign Application Priority Data

| | | | |
|---|---|---|---|
| Sep. 4, 1987 | [JP] | Japan | 62-222756 |
| Apr. 20, 1988 | [JP] | Japan | 63-98807 |
| Jul. 8, 1988 | [JP] | Japan | 63-91080[U] |

[51] Int. Cl.⁴ .................... G01D 15/10

[52] U.S. Cl. .................... 346/76 PH; 400/120; 400/719

[58] Field of Search .................... 400/662, 719; 346/76 PH

[56] References Cited

U.S. PATENT DOCUMENTS

| | | | |
|---|---|---|---|
| 4,505,603 | 3/1985 | Yana | 346/76 PH |
| 4,738,555 | 4/1988 | Nagashima | 400/120 |
| 4,739,341 | 4/1988 | Matsuno et al. | 346/76 PH |

FOREIGN PATENT DOCUMENTS

| | | | |
|---|---|---|---|
| 0582551 | 8/1933 | Fed. Rep. of Germany | 400/662 |
| 58-7376 | 1/1983 | Japan . | |
| 58-181678 | 10/1983 | Japan . | |
| 0076281 | 5/1984 | Japan | 346/76 PH |
| 60-157889 | 8/1985 | Japan . | |
| 0143155 | 6/1986 | Japan | 400/662 |
| 0222770 | 10/1986 | Japan | 400/662 |

OTHER PUBLICATIONS

"Feeding Roller".

*Primary Examiner*—B. A. Reynolds
*Assistant Examiner*—Huan Tran
*Attorney, Agent, or Firm*—Burns, Doane, Swecker & Mathis

[57] ABSTRACT

A thermal transfer recording apparatus for carrying out recording by driving a thermal head to transfer ink of an ink film in transportation. This apparatus includes a separating device disposed downstream of the thermal head with respect to a direction of ink film movement and spaced from a platen roller. The separating device has an uneven surface.

16 Claims, 5 Drawing Sheets

THERMAL TRANSFER RECORDING APPARATUS

BACKGROUND OF THE INVENTION (1) Field of the Invention

The present invention relates to a thermal transfer recording apparatus for carrying out recording by fusing or sublimating ink of an ink film by means of a thermal head. More particularly, the invention relates to an improvement for preventing creases formed on the ink film in transportation after use in recording from adversely affecting a recorded material.

(2) Description of Related Art

In a known thermal transfer recording apparatus, as shown in FIG. 1, recording paper 32 is transported with rotation of a platen roller 31, and an ink film 35 is fed from a supply reel 33 to the recording paper 32 and is wound up by a takeup reel 34. A thermal head 36 is operable to transfer ink of the ink film 35 onto the recording paper 32 to effect recording. The apparatus further comprises cylindrical guide rollers 37 and 38 upstream and downstream of a transfer section defined by the platen roller 31 and thermal head 36, respectively. The upstream guide roller 37 causes the ink film 35 to advance along the recording paper 32, and the downstream roller 38 separates the ink film 35 from the recording paper 32.

Such a thermal transfer recording apparatus, generally, effects recording by fusing or sublimating the ink of the ink film for transfer to the recording paper. The sublimation type is capable of controlling an amount of color to be transferred onto the recording paper. This feature provides the advantage of recording halftone images with refinement.

However, the thermal transfer recording apparatus of the sublimation type requires a large amount of energy to be applied to the thermal head for sublimating the ink. To effect recording with the same amount of energy, a thinner plastic base film is needed for the sublimation type apparatus than for the fusion type apparatus. When heated by the thermal head for effecting recording, a thin plastic base film develops a plurality of thermal deformations. Consequently, the ink film after being used for recording has many corrugations as shown in FIG. 5.

In the known apparatus, these corrugations are pressed by the cylindrical guide roller 38 which has a smooth planar surface. As a result, the slack corrugations fold upon themselves to form bulky creases as shown in FIG. 2. These creases are formed over a range extending at its rear end to the transfer section as shown in FIG. 3, which impairs tight contact among the ink film 35, thermal head 36 and recording paper 32 thereby lowering the quality of recorded images.

SUMMARY OF THE INVENTION

A primary object of the present invention, therefore, is to provide a thermal transfer recording apparatus capable of avoiding defective recording due to the thermal deformation of an ink film.

Another object of the invention is to provide an improved ink film separating device for preventing creases formed on the ink film during post-recording transportation from extending to an ink transfer section of the apparatus.

A further object of the invention is to provide a thermal transfer recording apparatus which is particularly suited for a sublimation type ink film.

The above objects are fulfilled, according to the present invention, by a thermal transfer recording apparatus comprising a thermal head including a plurality of heating elements arranged in a row; a platen roller for transporting recording paper to a position opposed to the thermal head; ink film transport means including a supply reel for supplying an ink film and a takeup reel for taking up the ink film, the ink film transport means transporting the ink film, synchronously with recording paper transportation, to a recording section where the thermal head and the platen roller are opposed to each other; and an idle roller slightly spaced from a peripheral surface of the platen roller for contacting a back face of the ink film between the recording section and the takeup reel, to be rotatable with movement of the ink film, the idle roller including grooves in a grid form peripherally thereof.

In a preferred embodiment of the invention, the grooves defined peripherally of the idle roller include a first group of grooves extending at an oblique angle with respect to a direction of ink film transport and a second group of grooves intersecting the first group of grooves.

Alternatively, these grooves may include a first group of grooves extending parallel to a direction of ink film transport and a second group of grooves perpendicular to the first group of grooves.

According to the above construction, any corrugations formed on the ink film after use in recording come into contact with the grooves and their ridges defined peripherally of the idle roller. The resulting friction prevents the ink film from crumpling in its transverse direction. Moreover, the slack corrugations of the ink film are received in the grooves of the idle roller, thereby avoiding creasing of the ink film formed by the corrugations folding upon themselves. Thus, there is no defective recording due to such creases.

The foregoing objects and advantages are achieved also by a thermal transfer recording apparatus comprising a thermal head including a plurality of heating elements arranged in a row; a platen roller for transporting recording paper to a position opposed to the thermal head; ink film transport means including a supply reel for supplying an ink film and a takeup reel for taking up the ink film, the ink film transport means transporting the ink film, synchronously with recording paper transportation, to a recording section where the thermal head and the platen roller are opposed to each other; and an idle roller slightly spaced from a peripheral surface of the platen roller for contacting a back face of the ink film between the recording section and the takeup reel, to be rotatable with movement of the ink film, the idle roller including a plurality of fine projections peripherally thereof.

According to a further aspect of the invention, there is provided a thermal transfer recording apparatus comprising a thermal head including a plurality of heating elements arranged in a row; a platen roller for transporting recording paper to a position opposed to the thermal head; ink film transport means including a supply reel for supplying an ink film and a takeup reel for taking up the ink film, the ink film transport means transporting the ink film, synchronously with recording paper transportation, to a recording section where the thermal head and the platen roller are opposed to each other;

and an idle roller for contacting a back face of the ink film between the recording section and the takeup reel to be rotatable with movement of the ink film, the idle roller including on a peripheral surface thereof a layer deformable through contact with the ink film.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DETAILED DESCRIPTION OF THE PREFERRED EMBODIMENTS

Figure 1:
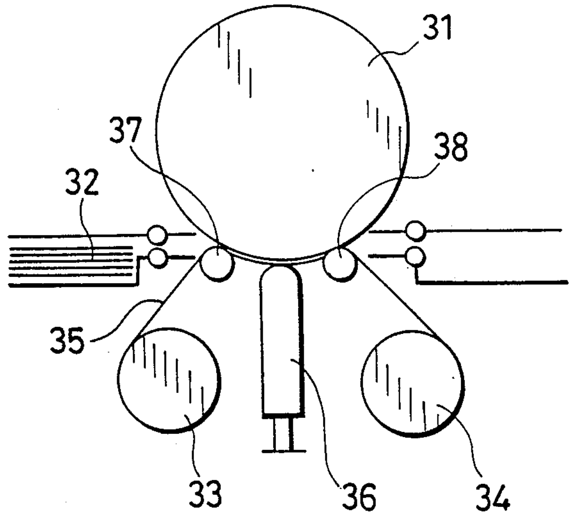
Fig. 1 (Prior Art)
FIG. 1 is a schematic view of a thermal transfer recording apparatus known in the art.
Figure 2:
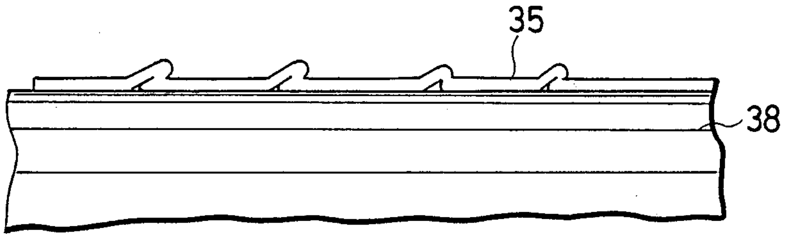
Fig. 2 (Prior Art)
FIG. 2 is a view of an ink film with creases formed thereon through contact with a separating roller in the prior art.
Figure 3:
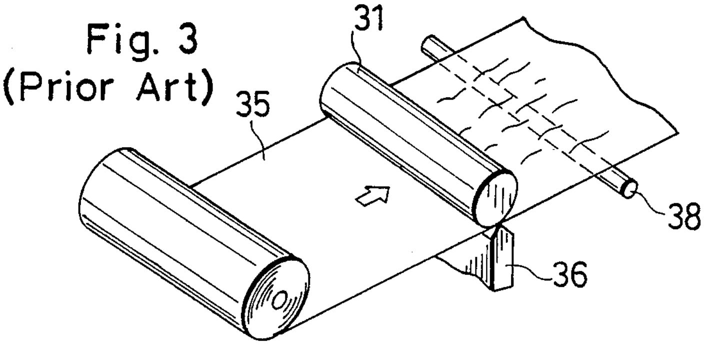
Fig. 3 (Prior Art)
FIG. 3 is an explanatory view of the ink film, a thermal head and the separating roller of the known apparatus shown in a linear arrangement for illustrating how the creases are formed.
Figure 4:
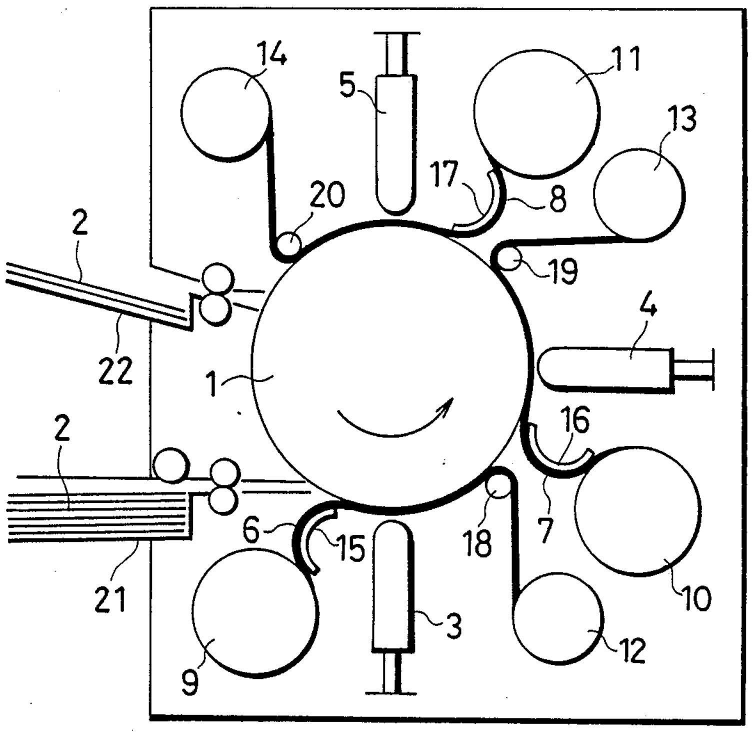
FIG. 4 is a schematic view of a thermal transfer recording apparatus embodying the present invention.

An embodiment of the present invention will be described hereinafter with reference to the drawings. FIG. 4 is a schematic view of a principal portion of a thermal transfer recording apparatus according to the invention. The illustrated apparatus comprises a platen roller 1 for supporting recording paper 2, and thermal heads 3–5 arranged at an angle of 90 degrees with respect to one another around the platen roller 1. Each of the thermal heads 3–5 carries heating elements at a forward end thereof, not shown, which are heated by pulses applied thereto. Numerals 6–8 indicate ink films interposed between the thermal heads 3–5 and platen roller 1, respectively. These ink films comprise a yellow ink film 6, a magenta ink film 7 and a cyan ink film 8 for carrying out multicolor printing. The ink films 6–8 are wound around supply reels 9–11 before use and are taken up by takeup reels 12–14 via recording sections defined between the platen roller 1 and thermal heads 3–5, respectively.

Reference numerals 15–17 indicate guide plates having an arcuate shape in plan view and disposed between the ink films 6–8 and thermal heads 3–5 for guiding the ink films 6–8 into contact with the recording paper 2. Numerals 18–20 indicate separating rollers for separating the ink films 6–8 from the recording paper 2 after use for recording purposes. These separating rollers 18–20 are rotatably supported at positions between the thermal heads 3–5 and takeup reels 12–14 and slightly spaced from the peripheral surface of the platen roller 1 for contacting back faces of the ink films 6–8. The spacing between the separating rollers 18–20 and platen roller 1 is determined so that the separating rollers 18–20 do not press the ink films 6–8 against the platen roller 1 to excess. This spacing may be about the same as or greater than the sum of the thickness of each ink film and the thickness of the recording paper.

Numeral 21 indicates a tray from which the recording paper 2 is supplied. Number 22 indicates a tray to which the recording paper 2 is discharged.

Figure 6:
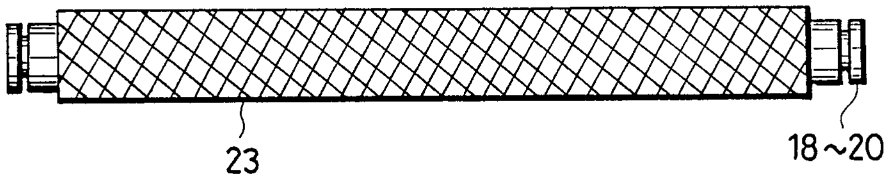
FIG. 6 is a view of a separating roller according to a first embodiment of the present invention.

As shown in FIG. 6, each of the separating rollers 18–20 has a cylindrical shape and includes grooves 23 in a grid form and extending at an oblique angle to the axis of the separating roller. Where the recording paper 2 is A4-size paper, for example, each separating roller 18, 19 or 20 is about 250 mm in length and 10 mm in diameter, and the grid grooves are formed at intervals of about 1 mm.

The separating rollers 18–20 are all freely rotatable, are thus driven by the ink films 6–8 being transported to the takeup reels 12–14, respectively. If the separating rollers 18–20 were fixed against rotation, they would impede the ink film takeup. If the separating rollers 18–20 were power-driven, the difficulties in adjusting their speed would result in an obstruction to the film transport due to tension applied to the ink films when the roller speed is too high, and in sagging of the ink films when the roller speed is too low. It is therefore important that the separating rollers 18–20 are arranged freely rotatable.

Each of the ink films 6–8 comprises a plastic base film and a sublimate ink layer coated thereon. The ink films 6–8 are wound on the supply reels 9–11 before use, and are transported via the guide plates 15–17, thermal heads 3–5 and separating rollers 18–20 to be taken up by the takeup reels 12–14. The unwinding at the supply reels 9–11 and takeup at the takeup reels 12–14 of the ink films 6–8 are effected at positions opposed to the thermal heads 3–5, and large angles can be formed between the recording paper 2 and ink films 6–8, respectively.

Figure 5:
FIG. 5 is a view of an ink film creased after use in recording.

When a recording start button (not shown) is pressed, the recording paper 2 on the supply tray 21 is fed into the apparatus and at the same time the platen roller 1 starts rotating. The recording paper 2 moves into contact with the yellow ink film 6, and yellow parts of an image is recorded thereon by the first thermal head 3. At this time the ink of the ink film 6 is instantaneously sublimated by the heat of the thermal head 3 to record a pattern on the surface of recording paper 2. The plastic base film of the ink film 6 is heated to the sublimation temperature of the ink, whereby the ink film becomes thermally deformed into a wave-like shape as shown in FIG. 5.

Figure 7:
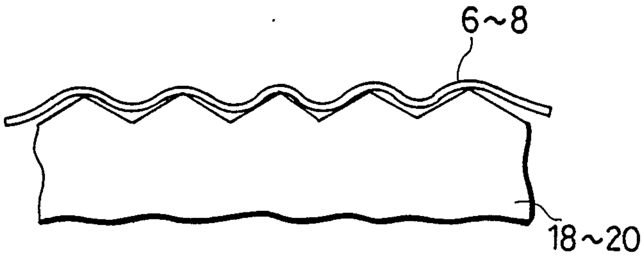
FIG. 7 is a view showing how slacks of the ink film are received in grid grooves of the separating roller shown in FIG. 6 thereby preventing the ink film becoming crumpled axially of the separating roller.
Figure 8:
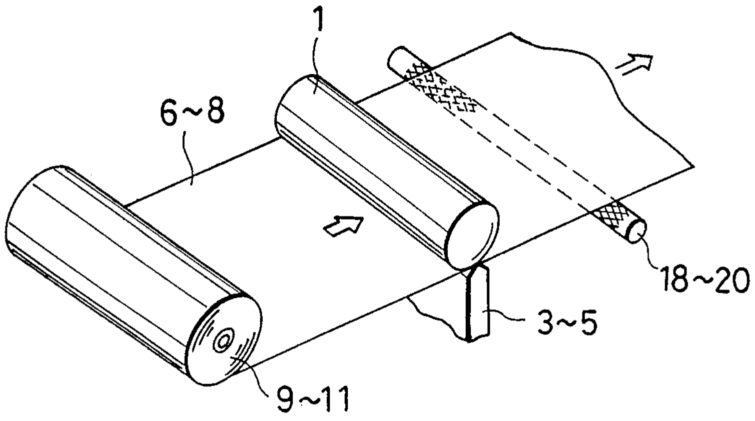
FIG. 8 is an explanatory view of the ink film, a thermal head and the separating roller shown in a linear arrangement for illustrating how creases are prevented according to the present invention.

As noted earlier, the separating roller 18 includes grid grooves 23 on its peripheral surface. Consequently, falling waves of the ink film 6 are received by the grid grooves as shown in FIG. 7. The ink film 6 is also prevented from becoming crumpled toward the middle of the separating roller 18. This function effectively avoids development of creases resulting from the slack sections of the ink film folding upon themselves. It will be noted that the separating roller 18 absorbs the slackening of the ink film while rotating with the movement of the ink film 6. The present invention now eliminates the possibility of recorded images becoming marred by the creases formed on the ink film after use in recording. FIG. 8 is a schematic view of the ink film 6, thermal head 3 and separating roller 18 arranged linearly for the purpose of illustration to show how the ink film 6 is transported free of creases.

The recording paper 2 carrying the yellow parts of the recorded image is transported further by the platen roller 1, and recording is effected thereon with the magenta ink film 7 and cyan ink film 8 in the same manner as described above, to complete color recording. These ink films 7 and 8 leaving the thermal heads 4 and 5 are also maintained free of creases by the separating rollers 19 and 20, to enable clear, flawless recording.

As noted hereinbefore, the guide plates 15–17 are provided upstream of the thermal heads 3–5 with respect to the movement of ink films 6–8, respectively. These guide plates 15–17 have an arcuate shape for contacting the back faces of ink films 6–8, thereby to effectively prevent the ink films 6–8 from becoming creased prior to the use in recording.

Figure 9:
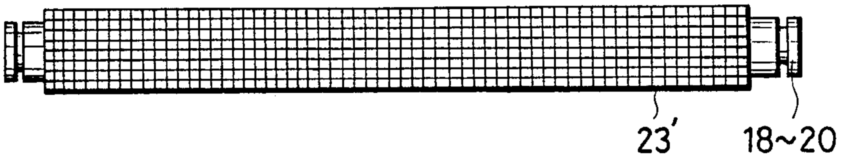
FIG. 9 is a view of a separating roller according to a second embodiment of the invention.

FIG. 9 is a front view of a separating roller according to a second embodiment of the present invention. This separating roller 6, or 8 includes grooves 23' in a grid form extending axially of the separating roller and in the transport direction of the ink film.

Figure 10:
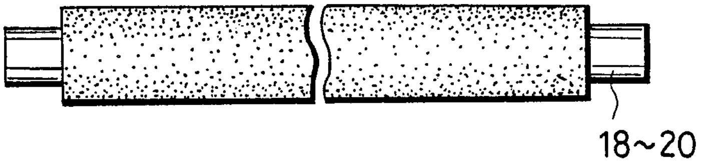
FIG. 10 is a view of a separating roller according to a third embodiment.
Figure 11:
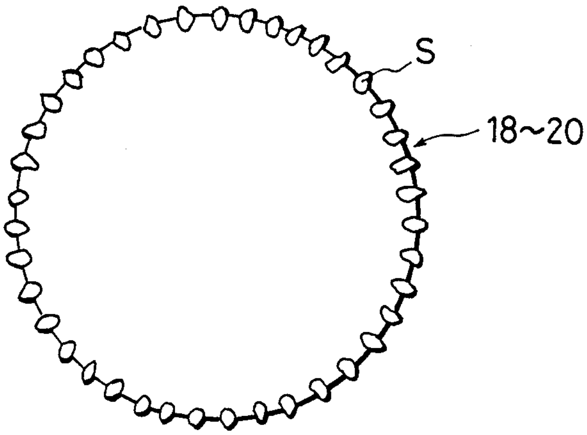
FIG. 11 is a sectional view of the separating roller according to the third embodiment.

FIG. 10 is a front view of a separating roller according to a third embodiment of the invention, and FIG. 11 is a section thereof. This separating roller 6, 7 or 8 carries particulate sands S of iron, aluminum or the like uniformly distributed over and bonded by an adhesive to the surface thereof. The particulate sands S adhering to the roller surface engage the ink film, and the resulting friction prevents the ink film, even if it has a smooth surface, from crumpling axially of the roller. Furthermore, the loose waves of the ink film are received in spaces among the multiplicity of particulate sands, whereby the ink film is maintained substantially creaseless.

Figure 12:
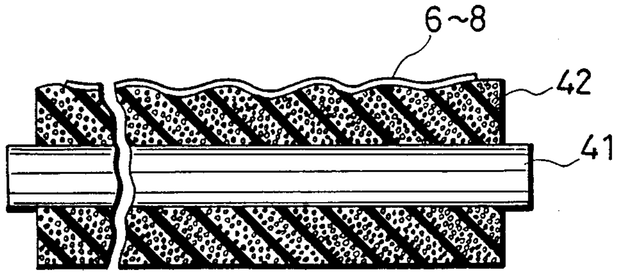
FIG. 12 is a sectional view of a separating roller according to a fourth embodiment.

FIG. 12 is a sectional view of a separating roller according to a fourth embodiment of the invention. This separating roller 6, 7 or 8 comprises an axial core 41 and a very soft and flexible elastic layer 42 surrounding the core 41. Preferably, the elastic layer 42 has a sufficient flexibility to be deformable by contact with the ink film to accommodate the ink film waves as illustrated. Such flexibility corresponds to a hardness in the range of 10–50 degrees according to the JIS, K6301, 5.2-spring hardness test, type C. The elastic layer 42 having the above degree of flexibility may be formed of a foamed material such as polyurethane foam. The elastic layer 42 may be made conductive and grounded. It will then be convenient in that an electrostatic charge generated around the thermal head is releasable through the separating roller.

In the case of the separating roller having the soft elastic layer 42, a peripheral surface of the layer 42 may contact the platen roller 1 when the ink film is not wound around the separating roller. However, such a contact should not be allowed to such a degree as to deform the elastic layer 42.

Figure 13:
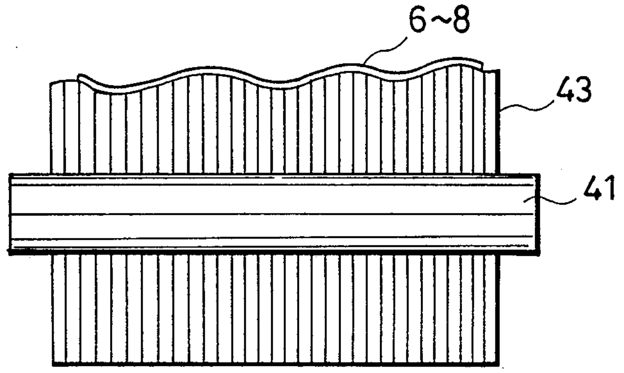
FIG. 13 is a sectional view of a separating roller according to a fifth embodiment.

FIG. 13 illustrates a separating roller according to a fifth embodiment of the invention. This separating roller 6, 7 or 8 is a soft brush, so to speak, comprising thin hair 43 planted around the core 41 as replacement for the elastic layer 42 in the fourth embodiment. The planted hair 43 may have the same flexibility as the elastic layer 42 in the fourth embodiment. Further, as in the fourth embodiment, the hair 43 may contact the platen roller 1 without being deformed.

The foregoing embodiments have been described in relation to a thermal transfer recording apparatus of the sublimation type. It will be appreciated, however, that the present invention produces the same effect with the fusion type apparatus where the ink film tends to be crumpled.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A thermal transfer recording apparatus comprising:

a thermal head including a plurality of heating elements arranged in a row;

a platen roller for transporting recording paper to a position opposed to said thermal head;

ink film transport means including a supply reel for supplying an ink film and a takeup reel for taking up the ink film, said ink film transport means transporting the ink film, synchronously with recording paper transportation, to a recording section where said thermal head and said platen roller are opposed to each other; and an idle roller slightly spaced from a peripheral surface of said platen roller for contacting a back face of the ink film between said recording section and said takeup reel, said idle roller rotatable with movement of the ink film, and said idle roller including grooves in a grid form on a peripheral surface thereof.

2. A thermal transfer recording apparatus as claimed in claim 1, wherein said grooves of said idle roller include a first group of grooves extending at an oblique angle with respect to a direction of ink film transport and a second group of grooves intersecting said first group of grooves.

3. A thermal transfer recording apparatus as claimed in claim 1, wherein said grooves of said idle roller include a first group of grooves extending parallel to a direction of ink film transport and a second group of groove perpendicular to said first group of grooves.

4. A thermal transfer recording apparatus as claimed in claim 1, wherein said ink film includes a base film formed of a plastic material and a sublimate ink layer formed on a surface of said base film.

5. The apparatus of claim 1, wherein the spacing between the platen roller and the idle roller is at least as great as the thickness of the ink film and recording paper.

6. The apparatus of claim 1, wherein the spacing between the platen roller and the idle roller is greater than the thickness of the ink film and recording paper.

7. A thermal transfer recording apparatus comprising:

a thermal head including a plurality of heating elements arranged in a row;

a platen roller for transporting recording paper to a position opposed to said thermal head;

ink film transport means including a supply reel for supplying an ink film and a takeup reel for taking up the ink film, said ink film transport means transporting the ink film, synchronously with recording paper transportation, to a recording section where said thermal head and said platen roller are opposed to each other; and an idle roller slightly spaced from a peripheral surface of said platen roller for contacting a back face of the ink film between said recording section and said takeup reel, said idle roller rotatable with movement of the ink film, and said idle roller including a plurality of fine projections on a peripheral surface thereof.

8. A thermal transfer recording apparatus as claimed in claim 7, wherein said ink film includes a base film formed of a plastic material and a sublimate ink layer formed on a surface of said base film.

9. The apparatus of claim 7, wherein the spacing between the platen roller and the idle roller is at least as great as the thickness of the ink film and recording paper.

10. The apparatus of claim 7, wherein the spacing between the platen roller and the idle roller is greater than the thickness of the ink film and recording paper.

11. A thermal transfer recording apparatus comprising:

a thermal head including a plurality of heating elements arranged in a row;

a platen roller for transporting recording paper to a position opposed to said thermal head;

ink film transport means including a supply reel for supplying an ink film and a takeup reel for taking up the ink film, said ink film transport means transporting the ink film, synchronously with recording paper transportation, to a recording section where said thermal head and said platen roller are opposed to each other; and an idle roller for contacting a back face of the ink film between said recording section and said takeup reel to be rotatable with movement of the ink film, said idle roller including on a peripheral surface thereof a layer deformable through contact with the ink film.

12. A thermal transfer recording apparatus as claimed in claim 11, wherein said deformable layer comprises an elastic material.

13. A thermal transfer recording apparatus as claimed in claim 11, wherein said deformable layer comprises a layer formed by planting hair in a base portion of said idle roller.

14. The apparatus of claim 11, wherein the spacing between the platen roller and the idle roller is at least as great as the thickness of the ink film and recording paper.

15. The apparatus of claim 11, wherein the spacing between the platen roller and the idle roller is greater than the thickness of the ink film and recording paper.

16. A thermal transfer recording apparatus as claimed in claim 12, wherein said elastic material is polyurethane foam.

* * * * *